Figure 1:
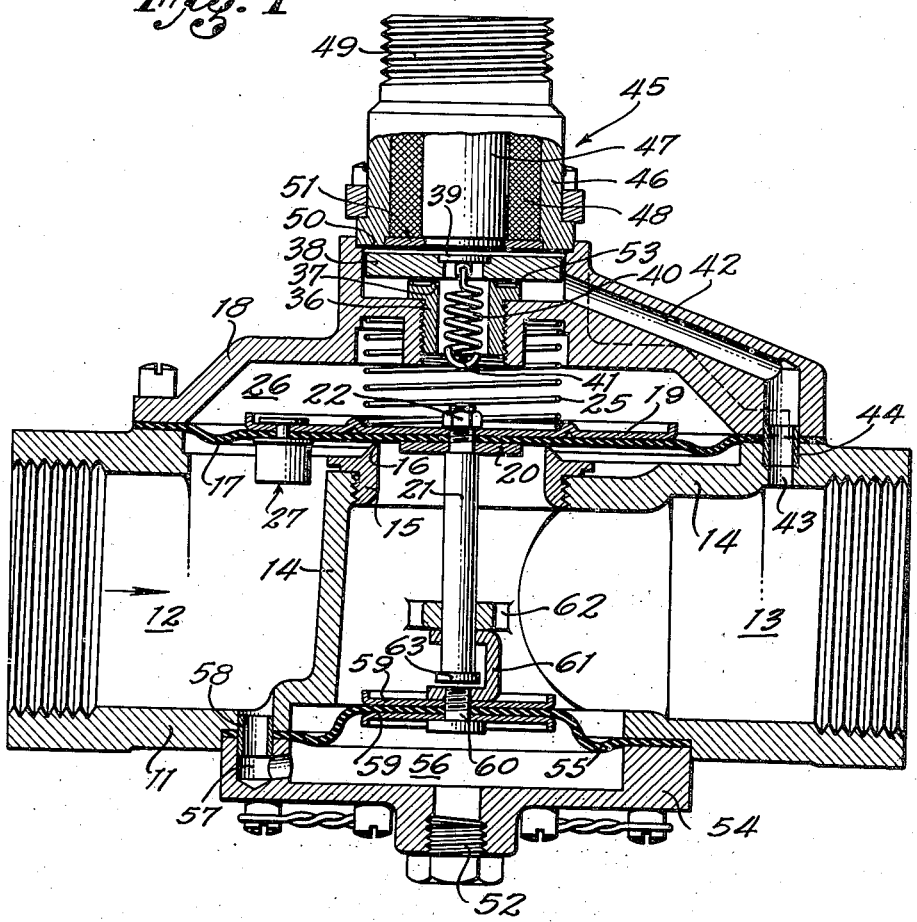

Nov. 13, 1945.  W. A. RAY  2,388,868
FLUID CONTROL VALVE
Filed Feb. 2, 1942

WILLIAM A. RAY, Inventor
By John H. Rouse, Attorney

Patented Nov. 13, 1945

2,388,868

UNITED STATES PATENT OFFICE 2,388,868

FLUID CONTROL VALVE

William A. Ray, Los Angeles, Calif., assignor to General Controls Co., a corporation Application February 2, 1942, Serial No. 429,260

8 Claims. (Cl. 137—139)

My present invention relates to fluid control valves, and has as its general object the provision of means whereby closure of a valve is automatically effected, regardless of the condition of the means normally controlling the operation of the valve, in the event that the pressure conditions in the valve become such that reversal of flow would occur.

While not so limited, this invention has particular utility in cabin-heating systems of airplanes, in which systems valves are employed for controlling the passage of vaporized engine fuel from the intake manifold of the engine, under the pressure generated by the engine's supercharger, to a burner located in the cabin of the airplane. Under certain conditions, as, possibly, when the engine is idling and the supercharger is thus not generating sufficient pressure, the pressure of the fluid at the outlet side of the valve may become greater than that at the inlet side so that, unless suitable check-valve means are employed, a reversal of flow through the valve and a consequent dilution of the fuel mixture being supplied through the manifold to the engine will occur. Since the conventional check-valve utilizes the pressure of the fluid for maintaining the same in its open position, the addition of such a valve for preventing reversal of fluid flow introduces an undesirably large pressure-drop in the system. It is therefore an object of this invention to provide, in a fluid control valve, means which offers no additional resistance to the normal flow of fluid through the valve, but which is effective to prevent reverse flow in the event that the fluid pressure in the normal outlet of the valve becomes greater than that in the inlet.

In certain types of fluid control valves the closure member is operated by means which, while normally effective to move the closure member between its open and closed positions, is yieldable so that supplemental operation of the closure member by means producing a force superior to that of the normal operating means is possible. One example of such operating means is a fluid pressure motor as is employed in an ordinary "diaphragm" valve. Another suitable example is one in which the normal operating means, whether manually or power-energized, actuates the closure member through yieldable means, such as a spring, the force of which can be overcome to close the valve. It is a particular object of this invention to provide, in a valve of the character described, supplemental means, normally maintained in inactive condition by the pressure of the controlled fluid, for moving the closure member to its closed position, against the force exerted thereon by the normal operating means, in the event that the pressure of the fluid at the outlet of the valve becomes greater than that at the inlet.

Figure 2:
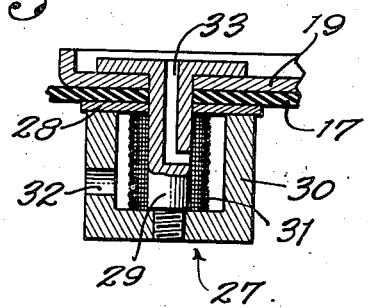

Other objects and advantages of this invention will be found in the description, the drawing and the appended claims; and for complete understanding of the invention, reference may be had to the following detailed description and accompanying drawing, wherein:

Figure 1 is a longitudinal sectional view of a valve embodying my invention; and Figure 2 is an enlarged detail section of the bleed-port assembly 27, shown in Fig. 1.

In the drawing, the numeral 11 indicates a valve casing having an inlet 12 and an outlet 13 separated by a partition 14 having an opening therethrough in which is threaded a port member 15 providing at its upper end a valve seat 16.

Closing an opening in the top wall of the casing 11 is a flexible diaphragm 17 clamped at its margin between the casing and a housing 18 secured thereon. The diaphragm 17 is of "neoprene," or other similar material, and its central portion cooperates with the seat 16 as a closure member. A stiffening plate 19 is secured on the upper side of the diaphragm 17, the diaphragm being clamped between this plate and a washer 20 by a stem 21, a threaded reduced end portion of which extends through the washer, the diaphragm, and the plate to receive a nut 22. The diaphragm is constantly urged toward the seat 16 by a spring 25 compressed between the plate 19 and the upper wall of the housing 18. The housing and the diaphragm define an upper pressure chamber 26 which is in constant communication with the inlet 12 through a bleed-port assembly 27.

This assembly 27 is shown in detail in Fig. 2 and comprises a bolt 29 which extends through openings in the diaphragm 17, plate 19 and a washer 28, the reduced lower end portion of the bolt being threaded into the bottom wall of a cup-shaped member 30, thus clamping the parts together. Encircling the bolt 29 and compressed between the cup-shaped member 30 and washer 28 is a filter-screen 31. An opening 32 is provided in the member 30 through which fluid can pass through the screen 31, and thence by way of a restricted passageway 33 in the bolt 29, to the chamber 26.

Threaded in an opening in the top wall of the housing 18 is a tubular insert 36 providing on its upper end a knife-edged pilot-valve seat 37 with which a closure member 38 is adapted to cooperate. Extending through the closure member 38 is a central opening, in the enlarged upper end of which is sealingly fitted a disk 39 to which is secured a tension spring 40 which constantly urges the closure member toward its seat, the lower end of the spring being secured to a pin 41 extending through the lower portion of the insert 36. The space surrounding the pilot valve seat 37 is fluidly connected with the outlet 13 by a passageway 42, formed in a thickened portion of the wall of housing 18, and an opening 43 in the top wall of the casing 11. A metal tube 44, resting in an upper enlargement of opening 43, serves to ensure proper placement of the diaphragm in assembly.

Mounted on, and closing an opening in, the top wall of the housing 18 is an electromagnet 45 having a cup-shaped outer core 46 and a solid cylindrical inner core 47, between the adjacent walls of which cores is an energizing coil 48. The outer core has at its upper end an extension 49 which forms a socket for connecting the electromagnet to a source of energy. The closure member 38 is of magnetic material and is adapted to be attracted to its open position by the electromagnet. A thin non-magnetic metallic diaphragm 50 is clamped at its margin between the lower end of the outer core 46 and the housing 18 to seal the electromagnet members from the fluid controlled by the valve, and to provide an air gap between the closure member and the electromagnet which serves to prevent magnetic sticking of these parts when the electromagnet is deenergized. A ring 51, of non-magnetic metal, is set in the shouldered lower ends of both the inner and outer cores to provide, with these parts, an unbroken plane surface abutting the top surface of the metal diaphragm 50 to prevent flexure and consequent rupture thereof.

A raised annular portion 53 of the insert 36 encircles the pilot-valve seat 37, the top surface of the annular portion 53 being positioned slightly below, but closely adjacent, the plane of the seat 37 to minimize uneven wear of the seat by limiting the degree of tilt that the closure member can assume in its engagement therewith. This feature is fully described and claimed in my copending application, Serial No. 418,707, filed November 12, 1941, now Patent No. 2,374,895, granted May 1, 1945.

Assuming the inlet 12 to be connected to a source of fluid under pressure, and the pilot closure member 38 to be in engagement with the seat 37, the fluid pressures acting on either side of the diaphragm 17 are equalized, because of fluid communication through the bleed-port assembly 27, and the diaphragm 17 is held in engagement with the valve seat 16 by the force of spring 25. If the electromagnet 45 is now energized, the pilot closure member 38 will be moved away from its seat, permitting fluid to flow from the chamber 26, past the seat 37, and through the passageway 42 to the outlet 13. Since the passageway 42 is considerably larger than the restricted opening 33, fluid can escape from the chamber 26 more rapidly than it can enter from the inlet 12, so that the pressure acting on the underside of the diaphragm is effective to raise the same against the force of spring 25, and fluid can then flow from the inlet 12 past the seat 16 to the outlet 13. Subsequent deenergization of the electromagnet 45 permits the pilot closure member 38 to return, under the force of spring 40, into engagement with its seat 37, thereby permitting equalization of the pressure above and below the diaphragm so that the main valve again closes.

Secured to the bottom wall of the casing 11, and closing an opening therein, is a cap 54, between which and the casing is secured the marginal portion of a flexible diaphragm 55 which defines with the interior of the gap a pressure chamber 56. This chamber, for which a drain plug 52 is provided, is in constant fluid communication with the inlet 12 through an opening 57 which extends through a portion of the cap 54, diaphragm 55, and the lower wall of the casing 11. A tubular insert 58 is provided in the opening to prevent obstruction of the same due to possible shifting of the diaphragm in assembly. Stiffening plates 59 are clamped on both sides of a central portion of the diaphragm 55 by a bolt 60 which extends through the plates and the diaphragm and is threaded into an opening in the lower arm of a U-shaped member 61. Integral with and extending inwardly from a side wall of the casing 11 is a stop-member 62, engageable by the upper arm of the U-shaped member 61 in its upward movement. The lower portion of the main diaphragm-stem 21 slidably extends through openings in the stop-member 62 and the upper arm of the U-shaped member 61, and is provided with a head 63 whereby upward movement of the main diaphragm 17 is limited, and also whereby a downward force thereon can be exerted by the lower diaphragm 55 through the U-shaped member 61.

When the valve inlet 12 is connected to a source of fluid under pressure, the underside of the diaphragm 55 is subjected to this pressure since it is fluidly connected to the inlet by the opening 57, so that this diaphragm and the U-shaped member 61 assume the positions shown in Fig. 1. Because of the lost-motion connection between the diaphragm 55 and the stem 21 provided by the member 61, when the diaphragm 55 is in raised position, normal movement of the main diaphragm 17 is unimpeded thereby. It will be understood that the weight of the lower diaphragm 55 and of the parts carried thereby is insufficient to overcome the opposing force on this diaphragm caused by the difference in pressure between the inlet and the outlet during the normal operation of the valve. However, if, while diaphragm 17 is in its raised position, a pressure change across the valve should occur, such that the pressure in the normal outlet 13 becomes greater than that in the inlet 12, the lower diaphragm 55 will be forced downward, due to the pressure on its upper side now being greater than that on its underside, and will exert, through the U-shaped member 61, a force on the stem 21 which will return the diaphragm 17 into engagement with its seat 16. Thus, reverse flow through the valve is prevented. Obviously, if the main diaphragm is in engagement with its seat when the pressure reversal across the valve occurs it will be retained in this position by the lower diaphragm because of the greater area of the latter with respect to that of the portion of the main diaphragm exposed to the outlet pressure. This action is effective, upon the pressure in the outlet 13 becoming greater than that in the inlet 12, regardless of the condition of the pilot valve as the effective downward force exerted on the stem 21 by the diaphragm 55 will always be sufficient, in conjunction with the force of spring 25, to overcome the opposing fluid force exerted on the main diaphragm 17.

While I have herein shown and described by way of illustration, a specific embodiment of my invention, I wish it to be understood that modifications may be made without departing from the spirit of the invention, and that I intend therefore to be limited only by the scope of the appended claims.

I claim as my invention:

1. In a fluid control valve: a casing having an inlet and an outlet separated by a ported partition providing a valve seat, a closure member cooperable with said valve seat, controllable means for applying a force to the closure member to urge it in a direction to leave its seat, said force being sufficient under normal conditions to open the closure member, and means for ensuring against flow of fluid through the valve in a reverse direction, comprising means for applying a force to the closure member sufficient to overpower said first-named force and operative only in response to the existence of abnormal pressure conditions in said outlet that otherwise would permit such reversal of flow, said last-named means being substantially independent of said first-named force-applying means and unactuated in normal operation of the valve.

2. In a fluid control valve: a casing having an inlet and an outlet separated by a ported partition providing a valve seat, a closure member cooperable with said valve seat, controllable means for applying a force to the closure member urging it toward open position, said force being sufficient under normal fluid pressure conditions in the casing to open the closure member, said force-applying means including a yieldable medium, and means for ensuring against reverse flow of fluid through the valve, comprising means for applying to the closure member a force superior to and opposing that of said first-named force, said last-named means comprising an auxiliary motor operated by fluid pressure conditions in the casing that otherwise would tend to cause such reverse flow, said auxiliary motor being unactuated in normal operation of the valve.

3. In a fluid control valve: a casing having an inlet and an outlet separated by a ported partition providing a valve seat; a closure member cooperable with said valve seat; controllable means for applying a force to the closure member to urge it in a direction to leave its seat, said force being sufficient under normal fluid pressure conditions in the casing to open the closure member, said force-applying means including a yieldable medium; and means for ensuring against reverse flow of fluid through the valve, comprising a mechanical connector for applying a closing force to the closure member sufficient to overcome said first-named force, and a fluid pressure operated motor for operating said connector only in response to the existence of abnormal fluid pressure conditions in the valve casing that otherwise would permit such reverse flow, said motor being unactuated in normal operation of the valve.

4. In a fluid control valve: a casing having an inlet and an outlet separated by a ported partition providing a valve seat; a closure member cooperable with said valve seat and biased toward closed position; controllable means for applying a force to the closure member urging it toward open position, said force being sufficient under normal fluid pressure conditions in the casing to open the closure member against the force of said bias, said force-applying means including a yieldable medium; and means for ensuring against reverse flow of fluid through the valve, comprising a motor operated by difference of fluid pressure between said inlet and said outlet, and a connection between the closure member and said motor, said motor and connection being so arranged that upon reversal of fluid pressure in the casing a force is thereby applied to the closure member opposing said first-named force, said opposing force and that of said bias being sufficient to overcome said first-named force, said motor being unactuated in normal operation of the valve.

5. A fluid control valve, as defined in claim 4, wherein the connection between the closure member and the motor is so constructed and arranged that relative movement of these parts can occur under normal pressure conditions in the casing, so that the closure member is unaffected by the motor when the same is subjected to said normal pressure.

6. In a fluid control valve: a casing having an inlet and an outlet separated by a ported partition providing a valve seat, a closure member cooperable with said valve seat, a motor operated by elastic fluid pressure for actuating said closure member and capable of so doing under normal fluid pressure conditions in the casing, pilot valve means for controlling said motor, and means for ensuring against reverse flow of fluid through the valve, comprising an auxiliary motor, having a connecting means with said closure member, operated by the pressure of the fluid in said casing for applying upon reversal of normal pressure in the casing a force to the closure member urging it toward closed position and overpowering the elastic fluid pressure in said first-named motor urging the closure member toward open position, said auxiliary motor being unactuated in normal operation of the valve.

7. In a valve for controlling flow of gaseous fluid: a casing having an inlet and an outlet separated by a ported partition providing a valve seat; a closure member cooperable with said valve seat; a motor operated by the pressure of the fluid controlled by the valve for actuating said closure member; pilot valve means for controlling said motor; and means for preventing reversal of fluid flow through the valve, comprising an auxiliary motor operated by difference of fluid pressure between said inlet and said outlet, and means for applying the force of said auxiliary motor to the closure member when the auxiliary motor is operated by reversal of normal fluid pressure in the casing and only in a direction urging the closure member toward its seat, the force of said auxiliary motor being sufficient to overcome the force of said first-named motor tending to open the closure member, said auxiliary motor being unactuated in normal operation of the valve.

8. In a valve for controlling flow of gaseous fluid: a casing having an inlet and an outlet separated by a ported partition providing a valve seat; a closure member cooperable with said valve seat; a motor operated by the pressure of the fluid controlled by the valve for actuating said closure member; pilot valve means for controlling said motor; and means for preventing reversal of fluid flow through the valve, comprising a movable partition, having a connecting means with said closure member, so arranged in said casing as to be subjected on one side to the pressure of the fluid in said inlet and on the opposite side to that in said outlet, and means, effective only when said partition is moved in response to pressure in the outlet in excess of that in the inlet, for applying the moving force of said partition to the closure member in a direction urging it toward its seat, the force produced by the partition being sufficient to overcome any closure-member-opening force produced by said pilot-valve-controlled motor, said partition being unactuated in normal operation of the valve.

WILLIAM A. RAY.